United States Patent [19]
Tanaka et al.

[11] Patent Number: 5,660,748
[45] Date of Patent: Aug. 26, 1997

[54] LASER BEAM MACHINE WITH AN OPTICAL FIBER CABLE

[75] Inventors: Hisao Tanaka; Akaru Usui; Takeshi Irino; Shigehiro Yoshiyasu, all of Aichi; Akira Ishimori, Hyogo, all of Japan

[73] Assignee: Mitsubishi Denki Kabushiki Kaisha, Tokyo, Japan

[21] Appl. No.: 606,733

[22] Filed: Feb. 27, 1996

[30] Foreign Application Priority Data

Feb. 28, 1995 [JP] Japan .................. 7-040839

[51] Int. Cl.$^6$ .................. B23K 26/02
[52] U.S. Cl. .................. 219/121.84; 219/121.6; 385/33
[58] Field of Search .................. 219/121.6, 121.78, 219/121.79, 121.8, 121.84; 385/33, 52

[56] References Cited

U.S. PATENT DOCUMENTS

| | | | |
|---|---|---|---|
| 4,443,684 | 4/1984 | Sakuragi et al. | 219/121.79 |
| 4,564,736 | 1/1986 | Jones et al. | 219/121.6 |
| 4,578,554 | 3/1986 | Coulter . | |
| 4,707,073 | 11/1987 | Kocher | 219/121.6 |
| 4,710,606 | 12/1987 | Soroka et al. . | |
| 4,749,250 | 6/1988 | Carter | 385/33 |
| 4,844,574 | 7/1989 | Chande | 219/121.6 |
| 4,958,900 | 9/1990 | Ortiz, Jr. | 385/33 |
| 4,997,250 | 3/1991 | Oritz, Jr. | 385/33 |
| 5,239,552 | 8/1993 | Okuyama et al. | 219/121.6 |
| 5,289,553 | 2/1994 | Ortiz, Jr. et al. | 385/33 |
| 5,293,023 | 3/1994 | Haruta et al. | 219/121.84 |

FOREIGN PATENT DOCUMENTS

| | | |
|---|---|---|
| 418170 | 3/1991 | European Pat. Off. . |
| 57-124586 | 8/1982 | Japan . |
| 62-8748 | 1/1987 | Japan . |
| 4-367387 | 12/1992 | Japan . |
| 1215714 | 12/1970 | United Kingdom . |
| 1275018 | 5/1972 | United Kingdom . |
| 2094993 | 9/1982 | United Kingdom . |
| 2229125 | 9/1990 | United Kingdom . |
| WO8402868 | 8/1984 | WIPO . |

*Primary Examiner*—Geoffrey S. Evans
*Attorney, Agent, or Firm*—Sughrue, Mion, Zinn, Macpeak & Seas

[57] ABSTRACT

A laser beam machine comprises an optical fiber cable for transmitting laser light, a beam output optical assembly for converging and emitting a laser beam and flexible protective conduits arranged along the X- and Y-axes accommodating the optical fiber cable as well as power and control cables for X- and Z-axis drive motors and an assist gas tube. While the beam output optical assembly can be moved along the X-, Y- and Z-axes, the flexible protective conduits do not bend in excess of the permissible bending radius of the optical fiber cable. The laser beam machine thus constructed provides improved reliability, safety and maintainability of the optical fiber cable as well as high laser beam converging performance and an enlarged machining area. In another embodiment a nozzle centering device is provided between an optical fiber cable and a nozzle housing holding a collimator lens and a condensor lens to align the optical axis of the optical fiber cable with the nozzle housing.

10 Claims, 7 Drawing Sheets

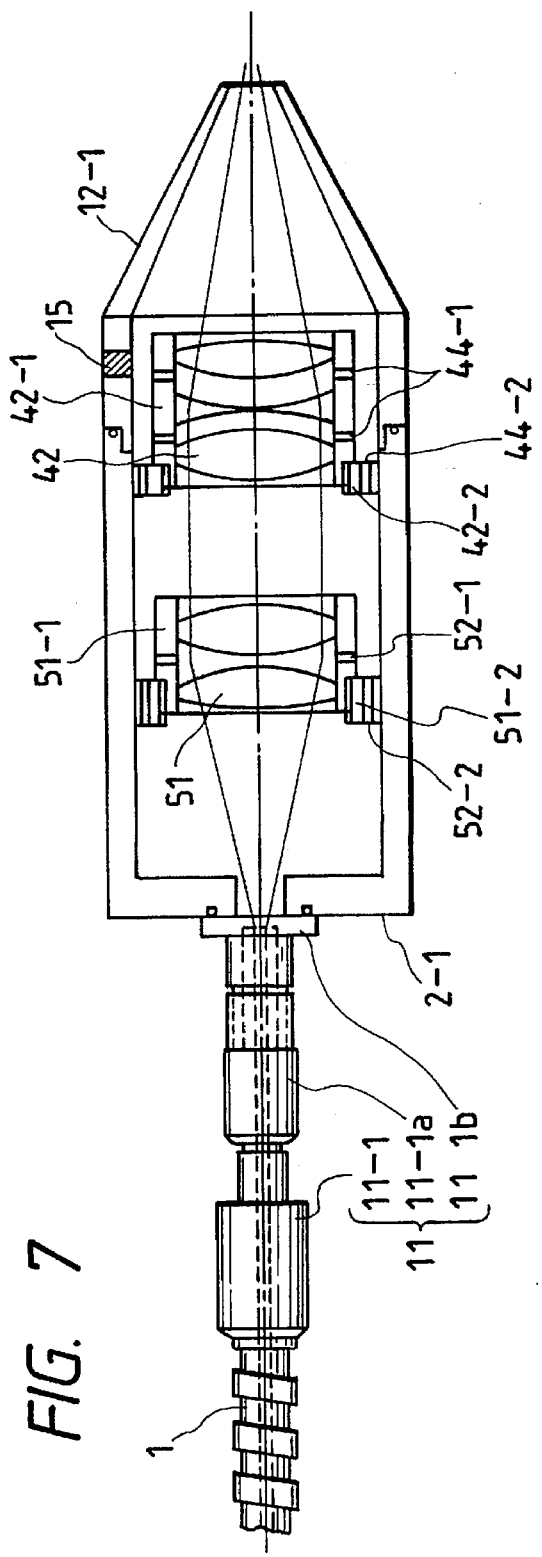
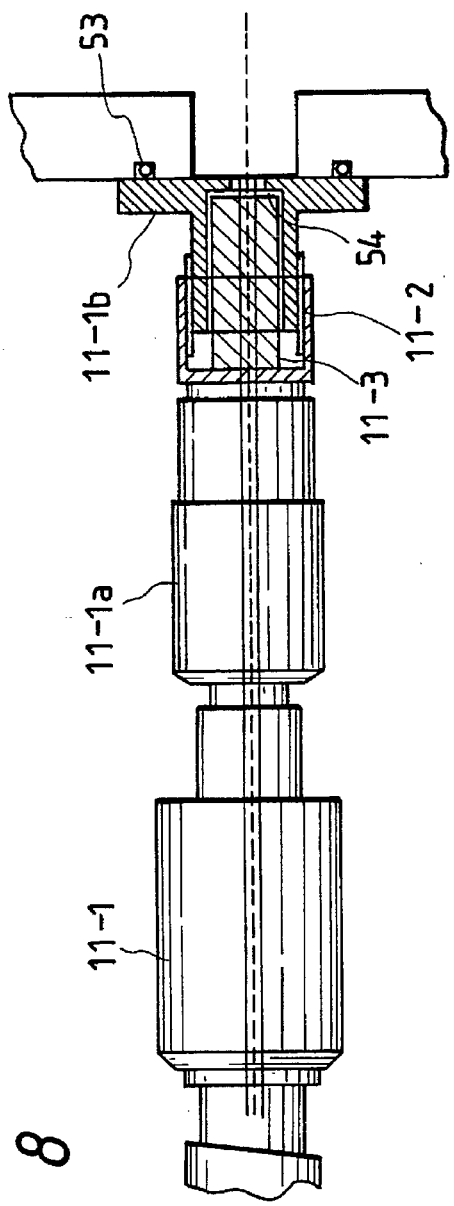
FIG. 7
FIG. 8

LASER BEAM MACHINE WITH AN OPTICAL FIBER CABLE

BACKGROUND OF THE INVENTION

The present invention pertains generally to laser beam machines and more particularly to their optical fiber wiring and beam output optical assemblies having improved structures.

It is known that a carbon dioxide gas ($CO_2$) laser, which features high beam quality (i.e., light-condensing capability), is an excellent light source for use in laser beam cutting of metal plates and sheets. Various types of $CO_2$ laser beam machines using mirrors and infrared-transparent optical fibers have thus far been proposed and developed for practical applications. On the other hand, yttrium-aluminum-garnet (YAG) lasers have been used in marking and trimming applications, for instance, because they have been able to provide good beam quality only in low-power ranges. However, recent technological advances have made it possible to develop YAG lasers which would offer as good beam quality as the $CO_2$ lasers even at output power levels exceeding 100 W. As a result, it has become possible for the YAG lasers, which utilize visible-light-transparent optical fibers featuring a high degree of operability and multi-purpose applicability, to achieve such cutting performance that is comparable to the $CO_2$ lasers.

FIG. 9 is a perspective diagram illustrating a light-condensing head positioning mechanism of a $CO_2$ laser beam machine utilizing an infrared-transparent optical fiber, of which example is disclosed in Japanese Patent Application No. 57-124586. In FIG. 9, there are provided a flexible optical fiber cable 1 containing an infrared-transparent optical fiber measuring 10.6 μm in wavelength at $CO_2$ laser connected to a laser oscillator (not shown) and a beam output optical assembly 2 connected to the end of the optical fiber cable 1. Designated by the numeral 3 is a table on which a workpiece W, e.g., a piece of sheet metal, is fixedly mounted. Designated by the numeral 4 is a positioning mechanism for moving the beam output optical assembly 2 above the workpiece W in a two-dimensional processing pattern. The positioning mechanism 4 includes a first carriage member 4-2 which moves along a pair of rails 4-1 and a second carriage member 4-3 which moves at right angles to the rails 4-1 along another pair of rails 4-4. The beam output optical assembly 2 is mounted to the second carriage member 4-3.

Described in the following is how the $CO_2$ laser beam machine of the above construction operates when marking a graphic or text pattern on the workpiece W. A marking process is commenced by first positioning the beam output optical assembly 2 just above a specified location of the workpiece W. A controller (not shown) transmits a control signal produced in accordance with readily entered marking pattern data. This control signal controls opening and closing operations of a shutter provided inside a $CO_2$ laser oscillator (not shown) in order to intermittently deliver and interrupt laser light. The laser light of an appropriate energy level transmitted to the beam output optical assembly 2 via the optical fiber cable 1 is switched on and off in this manner. The beam output optical assembly 2 is moved by the first carriage member 4-2 and second carriage member 4-3 of the positioning mechanism 4 above the workpiece W. When exposed to a laser beam radiated from the beam output optical assembly 2, resulting heat causes an exposed surface zone of the workpiece W to evaporate or melt so that the specified pattern is marked on the workpiece W in accordance with the movement of the beam output optical assembly 2 and the laser light switching on/off sequence.

The above-described $CO_2$ laser beam machine employs an optical fiber for laser light transmission. Unlike laser machining systems using mirrors for laser beam transmission, this type of laser beam machine can not be used for cutting a steel plate, for instance, due to a large transmission loss of the 10.6 μm infrared-transparent optical fiber. Development of a low transmission loss optical fiber has therefore been awaited. YAG laser machining systems also have a similar problem. Although transmission loss of optical fibers used for carrying visible light is sufficiently low, output power of a YAG laser that can provide satisfactory beam quality is limited to a few tens of watts.

Generally, it is necessary to eject an assist gas together with a laser beam through a coaxial nozzle to realize a high-quality cutting process. Different assist gases are used for different types of workpiece. As an example, oxygen is most often used for steel plates and stainless steel plates. In this example, it is possible to increase the cutting speed and reduce the amount of dross (i.e., waste product deposits caused in cutting operations) by increasing the gas pressure. Also effective for making efficient use of laser beam energy, increasing the cutting speed and reducing thermal distortion is to converge the laser beam on as small a spot as possible. It is a common practice in laser beam machining to construct beam output optical systems in consideration of the above aspects.

FIG. 10 is a cross-sectional view showing the structure of a conventional beam output optical assembly 2 used in YAG laser beam machines which employ optical fibers transparent to visible light. In FIG. 10, designated by the numeral 1 is an optical fiber cable containing an visible-light-transparent optical fiber in a flexible protective jacket. The beam output optical assembly 2 comprises a nozzle centering mechanism 12, a beam output optical assembly housing 2-1 provided with an assist gas inlet 15, a collimator lens 14 and a condenser lens 13. Designated by the numeral 11 is an optical fiber joint which connects the optical fiber cable 1 to the beam output optical assembly 2. The optical fiber joint 11 comprises an optical connector 11-1 including a plug 11-1a and a receptacle 11-1b. The receptacle 11-1b is screwed to one end of the beam output optical assembly housing 2-1. Mounted to the beam output optical assembly housing 2-1 at the opposite end to the optical fiber joint 11, the nozzle centering mechanism 12 includes a nozzle 12-1, a first nozzle holder 12-2, nozzle adjusting screws 12-3 mounted on the first nozzle holder 12-2 and a second nozzle holder 12-4.

Operation of the beam output optical assembly 2 of FIG. 10 is now described. The laser light transmitted through the optical fiber cable 1 is emitted from the end of the optical fiber at the optical connector 11-1 of the optical fiber joint 11. The laser light propagates through the air in a diverging pattern until it reaches the collimator lens 14, which brings the laser light into a parallel beam. The condenser lens 13 causes the parallel beam to converge so that the laser beam outgoing through the nozzle 12-1 is focused on the surface of a workpiece W. Before starting a cutting operation, a machine operator carries out an adjustment for aligning the laser beam with the center of the nozzle 12-1 by turning the nozzle adjusting screws 12-3. With this adjustment, an assist gas injected from the assist gas inlet 15 is uniformly blown onto a currently processed spot to accomplish a successful cutting operation.

The conventional laser beam machines constructed as described above provide limited machining areas using low-power laser beams. Their optical fiber cables are therefore simple in construction and suspension-type cable arrangements are sufficient to support them. With the advent of YAG lasers featuring high beam quality, attempts have been made to use them for high-speed cutting operations like $CO_2$ lasers. If a YAG laser is used for high-speed cutting, however, optical fibers connected to its beam output optical assembly may break due to severe swinging and vibration, resulting in laser light leakage into surrounding environments. Generally, the broader the machining area of a laser beam machine which produces high-power laser light applicable to metal cutting operations, the higher the risk of cable breakage. Other problems of prior art techniques are that it is difficult to trace down optical fiber breakage and maintain an optical fiber cable and that the optical fiber cable can hardly be arranged in a compact manner because its permissible bending radius differs from those of assist gas pipes, power cable and signal lines.

The aforementioned conventional beam output optical assembly 2 has at its foremost end the nozzle centering mechanism 12. This increases the physical dimensions of the beam output optical assembly 2 and limits the machining area. Since the assist gas is injected under about 10 kg/cm$^2$ the atmospheric pressure at maximum into a space confined by the nozzle 12-1 having a small orifice typically measuring about 2 mm in diameter, a thick single lens is used as the condenser lens 13 to avoid its physical damages. This poses another problem that it is necessary to use an expensive aspherical lens in order to prevent spherical aberration that can lead to degradation of laser light converging performance.

SUMMARY OF THE INVENTION

The present invention provides a solution to the aforementioned problems of the prior art. Accordingly, it is an object of the invention to provide a laser beam machine which can cut a metal plate using YAG laser light transmitted through an optical fiber cable. It is a more specific object of the invention to provide a laser beam machine featuring enhanced protection against optical fiber breakage for increased safety, ease of replacing the optical fiber in case of accidental breakage and improved laser light condensing performance, as well as a beam output optical assembly of which machining area is less likely to be limited.

In one aspect of the invention, a laser beam machine comprises an optical fiber cable for transmitting laser light; a beam output optical device for emitting the laser light delivered through the optical fiber cable; a positioning mechanism for moving the beam output optical device; an electric cable connected to the positioning mechanism; an assist gas tube connected to the beam output optical device; and a flexible protective conduit for accommodating the optical fiber cable, electric cable and assist gas tube; wherein the flexible protective conduit does not bend to such an extent that the beam output optical device bends in excess of its permissible bending radius.

In this construction, the optical fiber cable, electric cable and assist gas tube are all contained in the flexible protective conduit which does not bend in excess of the permissible bending radius of the optical fiber cable. This eliminates the risk of optical fiber breakage due to interference with peripheral components of the positioning mechanism, improves the reliability of the laser beam machine, and enhances the safety of working environments by making it possible to provide a cover on a cutting area of the laser beam machine.

Preferably, the flexible protective conduit is so constructed that the optical fiber cable can be accommodated separately from the electric cable and assist gas tube.

This arrangement makes it possible to quickly and easily carry out maintenance of the optical fiber cable, including its breakage inspection and replacement.

The flexible protective conduit may contain an optical fiber cable guide tube for accommodating the optical fiber cable.

This arrangement makes it possible to replace the optical fiber cable quickly and easily in case of its accidental breakage without removing and straightening the flexible protective conduit.

Alternatively, the inside space of the flexible protective conduit may be partitioned lengthwise by an internal wall for separately accommodating the optical fiber cable along such side of the flexible protective conduit that provides a larger bending radius than the other side.

In this configuration, cables and tubes other than the optical fiber cable, which do not require a large bending radius, can be properly arranged, resulting in a reduction in space requirements for installing the flexible protective conduit.

Another alternative configuration of the flexible protective conduit is such that it comprises a first flexible protective conduit for accommodating the electric cable and assist gas tube and a second flexible protective conduit for accommodating the optical fiber cable, wherein the second flexible protective conduit is provided on such side of the first flexible protective conduit that provides a larger bending radius.

Also in this configuration, cables and tubes other than the optical fiber cable, which do not require a large bending radius, can be properly arranged, resulting in a reduction in space requirements for installing the flexible protective conduit.

In another aspect of the invention, a laser beam machine comprises an optical fiber cable for transmitting laser light; a beam output optical device for emitting the laser light delivered through the optical fiber cable; and a nozzle centering mechanism provided between the optical fiber cable and beam output optical device for aligning the optical axis of the optical fiber cable with that of a nozzle of the beam output optical device.

This arrangement makes it possible to reduce the orifice size of the nozzle, providing not only the capability to process a small area but also an enlarged machining area.

The nozzle centering mechanism may comprise a movable member to which the optical fiber cable is fixed; a holder for retaining the movable member; and a fixing device provided on the holder for moving the movable member at right angles to the laser light path and fixing it in a desired position.

In this configuration, the laser light path is aligned with the nozzle by shifting the movable member by operating the fixing device. This also makes it possible to reduce the orifice size of the nozzle, providing not only the capability to process a small area but also an enlarged machining area.

Preferably, a surface area of the movable member that is kept in contact with the holder is coated with a low-friction material.

This arrangement serves to facilitate nozzle centering operation.

In yet another aspect of the invention, a laser beam machine comprises a beam output optical device including a collimator lens for converting incident laser light into parallel rays of light, a condenser lens for converging the parallel rays of light, and a housing for holding the collimator lens and condenser lens, the housing having a gas inlet for injecting an assist gas, wherein the collimator lens and condenser lens are compound lenses, each including a plurality of lenses, and the laser light converged by the condenser lens is emitted together with the assist gas; a transmitting medium fixing device for fixing a laser light transmitting medium to the housing; a condenser lens holder for holding the condenser lens, the condenser lens holder having a first group of through holes in its wall just between constituent lenses of the condenser lens; a condenser lens support for fixing the condenser lens holder to the housing, maintaining a gap therebetween, the condenser lens support having a second group of through holes extending in parallel with the laser light path; and a pressure-proof optical glass plate provided between the collimator lens and condenser lens for shutting out the assist gas.

The first and second groups of through holes provided respectively in the condenser lens holder and condenser lens support reduce pressure differentials between both sides of each individual lens. This arrangement, associated with the pressure-proof optical glass plate, helps reduce spherical aberration, converge the laser light more sharply, improve machining performance, and eliminate adverse effects of the assist gas pressure on the individual lenses.

The above laser beam machine may comprise, instead of the pressure-proof optical glass plate, a sealing mechanism provided between the transmitting medium fixing device and the housing for shutting out the assist gas; a collimator lens holder for holding the collimator lens, the collimator lens holder having a third group of through holes in its wall just between constituent lenses of the collimator lens; and a collimator lens support for fixing the collimator lens holder to the housing, maintaining a gap therebetween, the collimator lens support having a fourth group of through holes extending in parallel with the laser light path.

The first to fourth groups of through holes provided respectively in the condenser lens holder, condenser lens support, collimator lens holder and collimator lens support reduce pressure differentials between both sides of each individual lens. This arrangement, associated with the sealing mechanism provided between the transmitting medium fixing device and the housing, helps reduce spherical aberration, converge the laser light more sharply, improve machining performance, and eliminate adverse effects of the assist gas pressure on the individual lenses

BRIEF DESCRIPTION OF THE DRAWINGS

FIG. 7 is a cross-sectional view of a beam output optical assembly used in a laser beam machine according to a seventh embodiment of the invention;

FIG. 8 is a fragmentary cross-sectional view showing a cable connecting structure of the beam output optical assembly according to the seventh embodiment of the invention;

DETAILED DESCRIPTION OF THE PREFERRED EMBODIMENTS

Figure 1:
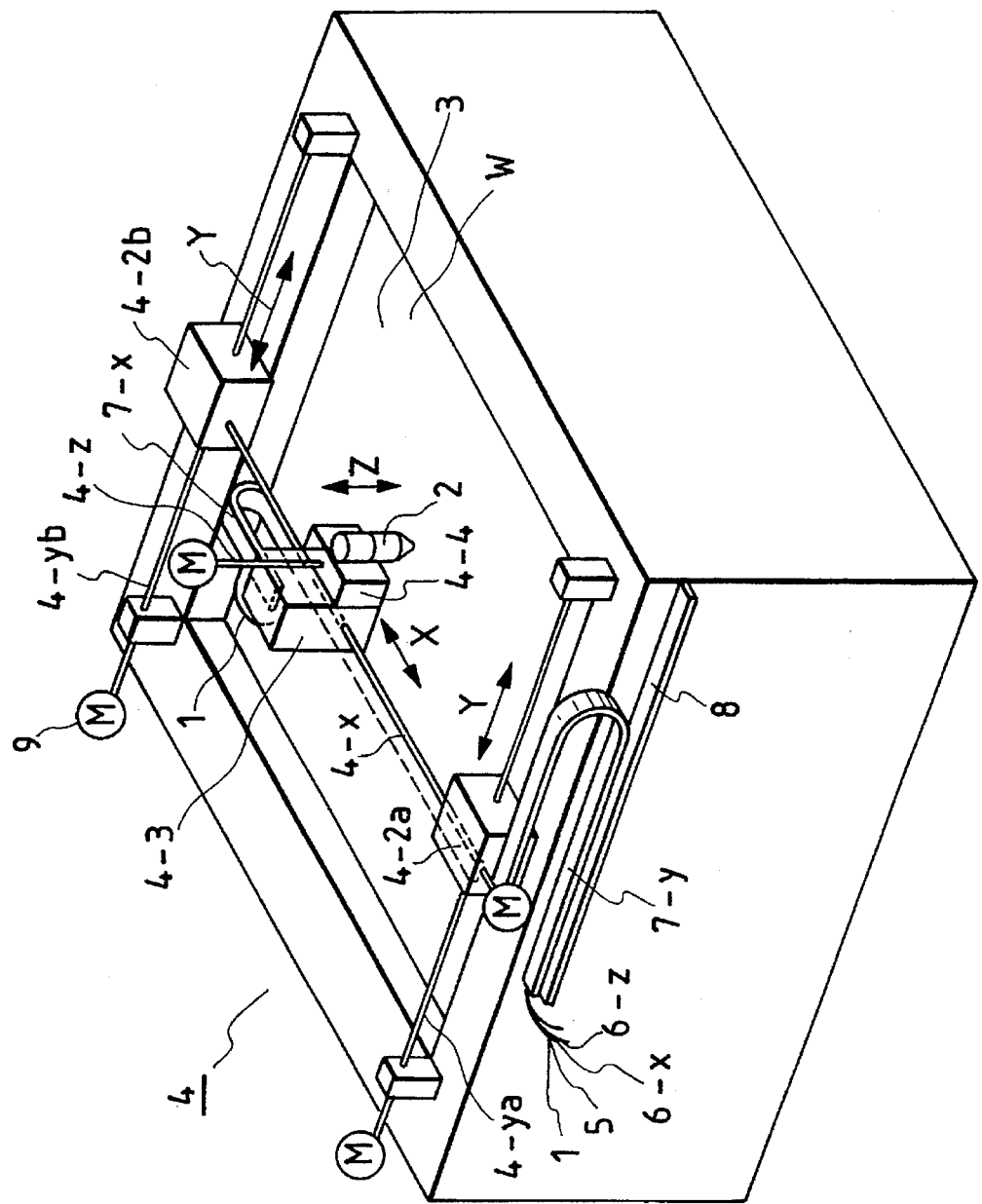
FIG. 1 is a perspective diagram illustrating a positioning mechanism of a laser beam machine according to a first embodiment of the invention.

Embodiments of the invention will now be described with reference to the accompanying drawings, in which like reference numerals designate like elements.

(FIRST EMBODIMENT)

FIG. 1 is a perspective diagram illustrating a positioning mechanism 4 of a laser beam machine according to the first embodiment of the invention. The positioning mechanism 4 of the laser beam machine has a total of four axes of movement including one each axis in the X- and Z-directions and two axes in the Y-direction. Referring to FIG. 1, designated by the numerals 4-*ya* and 4-*yb* are ball screws separately provided in the Y-direction, and designated by the numerals 4-2*a* and 4-2*b* are a pair of first carriage members which are individually moved in the Y-direction along the ball screws 4-*ya* and 4-*yb* by respective axial drive motors 9. Designated by the numerals 4-*x* and 4-*z* are ball screws mounted in the X- and Z-directions, respectively. Designated by the numeral 4-3 is a second carriage member which moves in the X-direction along the ball screw 4-*x*, and designated by the numeral 4-4 is a third carriage member which moves in the Z-direction along the ball screw 4-*z*. Designated by the numeral are assist gas tubes while designated by the numerals 6-*x* and 6-*z* are power/control cables for the X- and Y-axis drive motors 9, respectively. Designated by the numeral 7-*x* and 7-*y* are flexible protective conduits provided in parallel with the X- and Y-axes, respectively, containing an optical fiber cable 1, assist gas tubes 5, X- and Y-axis drive motor power/control cables 6-*x* and 6-*z*, and designated by the numeral 8-*y* is a guide for guiding the flexible protective conduit 7-*y*.

Figure 9:
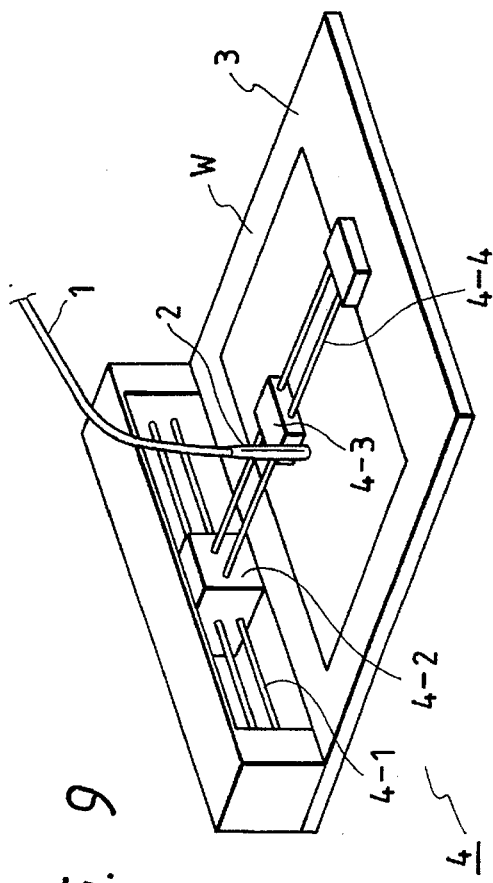
FIG. 9 is a perspective diagram illustrating a positioning mechanism of a conventional $CO_2$ laser beam machine.
Figure 10:
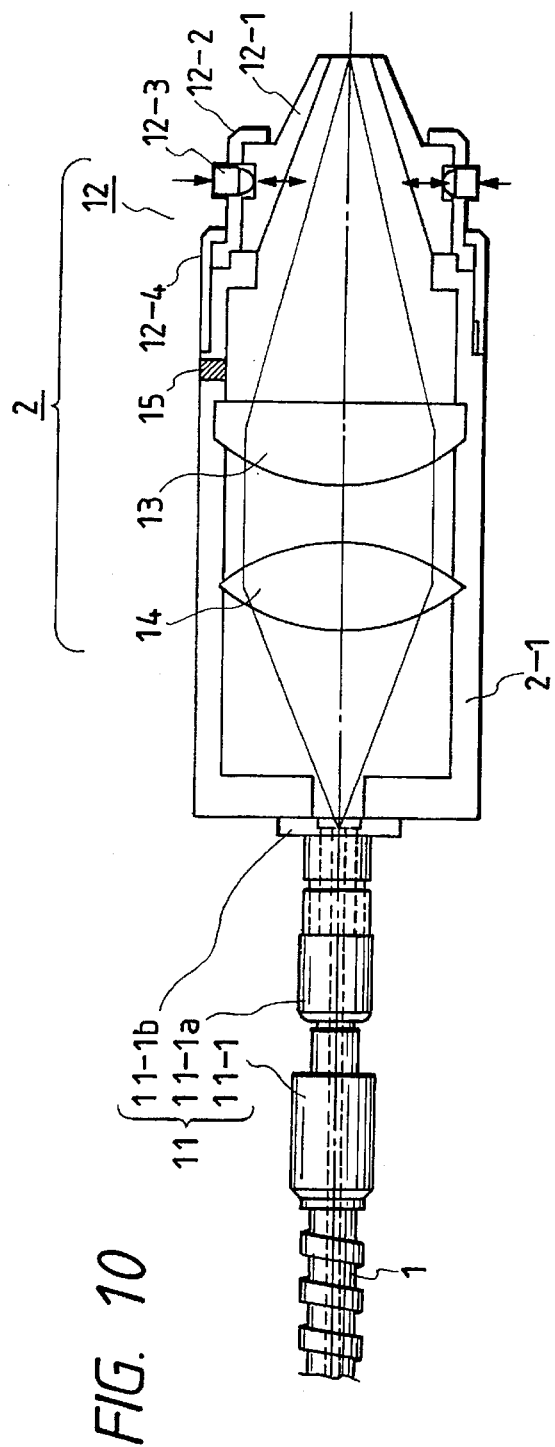
FIG. 10 is a cross-sectional view of a beam output optical assembly used in a conventional YAG laser beam machine.

In FIG. 1, like reference numerals as used in FIG. 9 which depicts the conventional laser beam machine designate like elements. Their description is therefore omitted here.

Now, operation of the positioning mechanism 4 of FIG. 1 is described. Driven by the axial drive motors 9, the pair of first carriage members 4-2*a* and 4-2*b* travel in the direction of the Y-axis along the separately provided ball screws 4-*ya* and 4-*yb*. Similarly, the second carriage member 4-3 travels in the direction of the X-axis along the ball screw 4-*x* and the third carriage member 4-4 travels in the direction of the Z-axis along the ball screw 4-*z*. A beam output optical assembly. 2 mounted to the third carriage member 4-4 can therefore be moved around within the area of a workpiece W placed on a table 3. Movements of the beam output optical assembly 2 in the X-, Y-and Z-axes are controlled by control signals fed from a control panel (not shown).

Laser light produced by a solid laser oscillator (not shown) is delivered to the positioning mechanism 4 of the laser beam machine through a first portion of the optical fiber cable 1 which is contained in a flexible metallic tube. Then, the laser light is sent to the beam output optical assembly 2 through the remaining portion of the optical fiber cable 1 which is contained together with the assist gas tubes 5, X- and Z-axis drive motor power/control cables 6-x and 6-z in the flexible protective conduits 7-x and 7-y routed in parallel with the X- and Y-axes, respectively. The flexible protective conduit 7-y is mounted in parallel with the Y-axis with its one end fixed to the guide 8-y and the other end to the first carriage member 4-2a. The flexible protective conduit 7-y can flex and move on the guide 8-y in accordance with movements of the first carriage member 4-2a along the Y-axis. Similarly, the flexible protective conduit 7-x is mounted in parallel with the X-axis with its one end fixed to the first carriage member 4-2a and the other end to the second carriage member 4-3. The flexible protective conduit 7-x can flex and move on a guide 8-x (not shown) in accordance with movements of the second carriage member 4-3 along the X-axis. Among the optical fiber cable 1, assist gas tubes 5, X- and Z-axis drive motor power/control cables 6-x and 6-z contained within the flexible protective conduits 7-x and 7-y, the X-axis drive motor power/control cable 6-x leaves the flexible protective conduit 7-x at the position of the first carriage member 4-2a and is wired to its appropriate connecting point while the optical fiber cable 1, assist gas tubes 5 and Z-axis drive motor power/control cable 6-z leave the flexible protective conduit 7-x at the position of the second carriage member 4-3 and connected to their respective destinations.

The following discussion describes how the laser beam machine thus constructed works when cutting the workpiece W which is assumed to be sheet metal, for instance. A cutting operation is commenced by positioning the beam output optical assembly 2 at an optimum height above the workpiece W at the beginning. A controller (not shown) transmits a control signal produced in accordance with readily entered cutting pattern data. This control signal controls opening and closing operations of a shutter provided inside the solid laser oscillator (not shown) in order to intermittently deliver and interrupt laser light. The laser light of an appropriate energy level transmitted to the beam output optical assembly 2 via the optical fiber cable 1, which is contained in the flexible protective conduits 7-x and 7-y together with the assist gas tubes 5, X- and Z-axis drive motor power/control cables 6-x and 6-z, is switched on and off in this manner. The beam output optical assembly 2 is moved by the first carriage members 4-2a and 4-2b and second carriage member 4-3 of the positioning mechanism 4 above the workpiece W. The flexible protective conduits 7-x and 7-y individually roll back in a U-shape of a specified radius and move along the guides 8-x and 8-y (not shown), respectively, in accordance with the movement of the beam output optical assembly 2. (In this embodiment, the bending radius of the flexible protective conduits 7-x and 7-y is set to 15 cm since the optical fiber cable 1 has a permissible bending radius of 10 cm.) When exposed to a laser beam radiated from the beam output optical assembly 2, the exposed portion of the workpiece W melts and evaporates. The pressurized assist gas accelerates the melting and evaporation processes and blows away molten metal and other waste products. The workpiece W is cut into a specified shape in accordance with the movement of the beam output optical assembly 2 and the laser light switching on/off sequence.

It should be appreciated from the above discussion that the invention enables simple and neat wiring and tubing to the positioning mechanism 4. This eliminates the risk of optical fiber breakage due to interference with peripheral components of the positioning mechanism 4, makes the optical fiber less prone to physical damages even when the beam output optical assembly 2 is moved faster and over a larger machining area, improves the reliability of the laser beam machine by significantly reducing the risk of laser light leakage, and enhances the safety of working environments by making it possible to provide a cover on a cutting area of the laser beam machine.

(SECOND EMBODIMENT)

The first embodiment described above provides an improved wiring and tubing arrangement which employs the flexible protective conduits 7-x and 7-y for accommodating the optical fiber cable 1, assist gas tubes 5 and X- and Z-axis drive motor power/control cables 6-x and 6-z together to prevent the optical fiber cable 1 from being bent in excess of the permissible bending radius. Although the optical fiber cable 1 is reinforced itself, its internal optical fiber may break or otherwise be damaged if optical fiber cable 1 is handled without care when inserting it into the flexible protective conduits 7-x and 7-y. It is impossible to find any optical fiber breakage until the optical fiber cable 1 is completely inserted into the flexible protective conduits 7-x and 7-y. In certain cases, the laser beam machine could be used for cutting a workpiece W without knowing that its optical fiber is almost broken. If the optical fiber breaks halfway in a cutting operation, it would be necessary to interrupt the operation and replace the optical fiber cable 1. Since the optical fiber cable 1 has an unsmooth external shape, it is apt to be caught by surrounding components. It is therefore necessary to remove and straighten the flexible protective conduits 7-x and 7-y and take out all the tubes and cables before inserting a replacement optical fiber cable 1. The second embodiment described below provides a yet improved structure which will allow easy replacement of the optical fiber cable 1.

Figure 2:
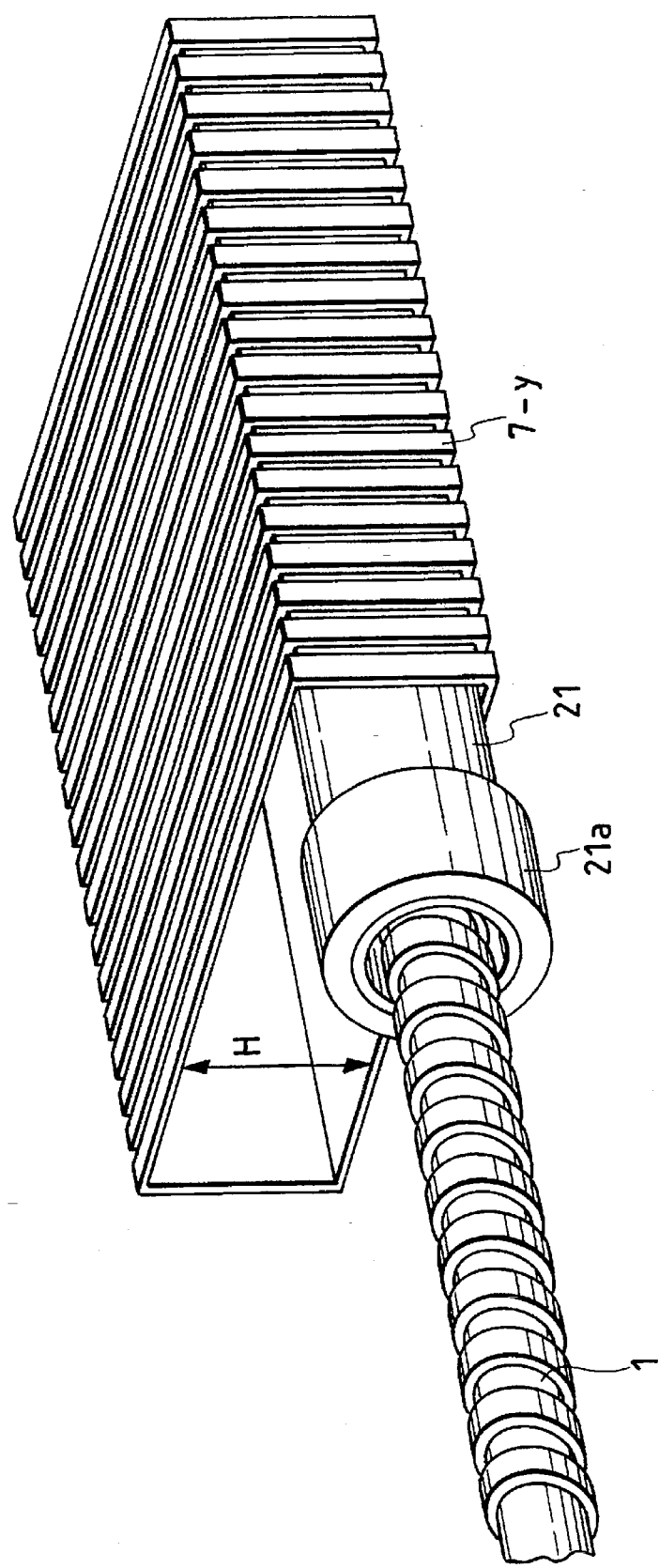
FIG. 2 is a perspective diagram illustrating an end portion of a flexible protective conduit of a laser beam machine according to a second embodiment of the invention.

FIG. 2 is a perspective diagram illustrating an end portion of a wiring and tubing structure of a laser beam machine according to the second embodiment of the invention, in which a flexible protective conduit 7-y contains an optical fiber cable guide tube 21. The optical fiber cable 1 coming from the solid laser oscillator (not shown) is introduced into the flexible protective conduit 7-y through the optical fiber cable guide tube 21. In this embodiment, the positioning mechanism 4 has the same general construction as the first embodiment, except that each flexible protective conduit includes a dedicated structure for separately passing the optical fiber cable 1. In FIG. 2, there is shown the flexible protective conduit 7-y which can flexibly move on the guide 8-y (not shown) along the Y-axis as previously discussed with reference to the first embodiment. The optical fiber cable guide tube 21 has a smooth inside surface and its inside diameter is larger than the maximum outside diameter of the optical fiber cable 1 including its optical connector. The length of the optical fiber cable guide tube 21 is larger than the flexible protective conduit 7-y. Designated by the numeral 21a is a fixing member attached to each end of the optical fiber cable guide tube 21. The outside diameter of each fixing member 21a is larger than inside dimension H of the flexible protective conduit 7-y.

The flexible protective conduit 7-y contains usually three assist gas tubes 5 (not shown) to provide a choice of assist gas types depending on materials to be cut. Also contained in the flexible protective conduit 7-y are the X- and Z-axis drive motor power/control cables 6-x and 6-z (not shown) and the optical fiber cable guide tube 21 through which the optical fiber cable 1 is passed. Another flexible protective conduit 7-x also has a similar configuration to the flexible protective conduit 7-y.

Discussed in the following is how the second embodiment works when cutting a workpiece W. As the beam output optical assembly 2 moves during a cutting operation, the optical fiber cable guide tubes 21 and optical fiber cable 1 contained therein are caused to bend together with the flexible protective conduits 7-x and 7-y. The flexible protective conduits 7-x and 7-y do not bend to such an extent that the optical fiber cable 1 bends in excess of the permissible bending radius. The inside diameter of each optical fiber cable guide tube 21 is large enough to accommodate even the thickest portion of the optical fiber cable 1 including its optical connector so that the optical fiber cable 1 can be easily inserted into and pulled out of the individual optical fiber cable guide tubes 21.

In this configuration, the optical fiber cable 1 can be smoothly inserted and pulled out without removing and straightening the flexible protective conduits 7-x and 7-y. This makes it possible to quickly and easily carry out maintenance of the optical fiber cable 1, including its breakage inspection and replacement.

Although the second embodiment described above employs Teflon tubes as the dedicated optical fiber cable guide tubes 21 for passing the optical fiber cable 1 through the individual flexible protective conduits 7-x and 7-y, the shape and material of such guide tubes are not limited thereto as long as they have a smooth inside surface, mechanical flexibility and sufficient inside space to accommodate the optical fiber cable 1 including its optical connector.

(THIRD EMBODIMENT)

Figure 3:
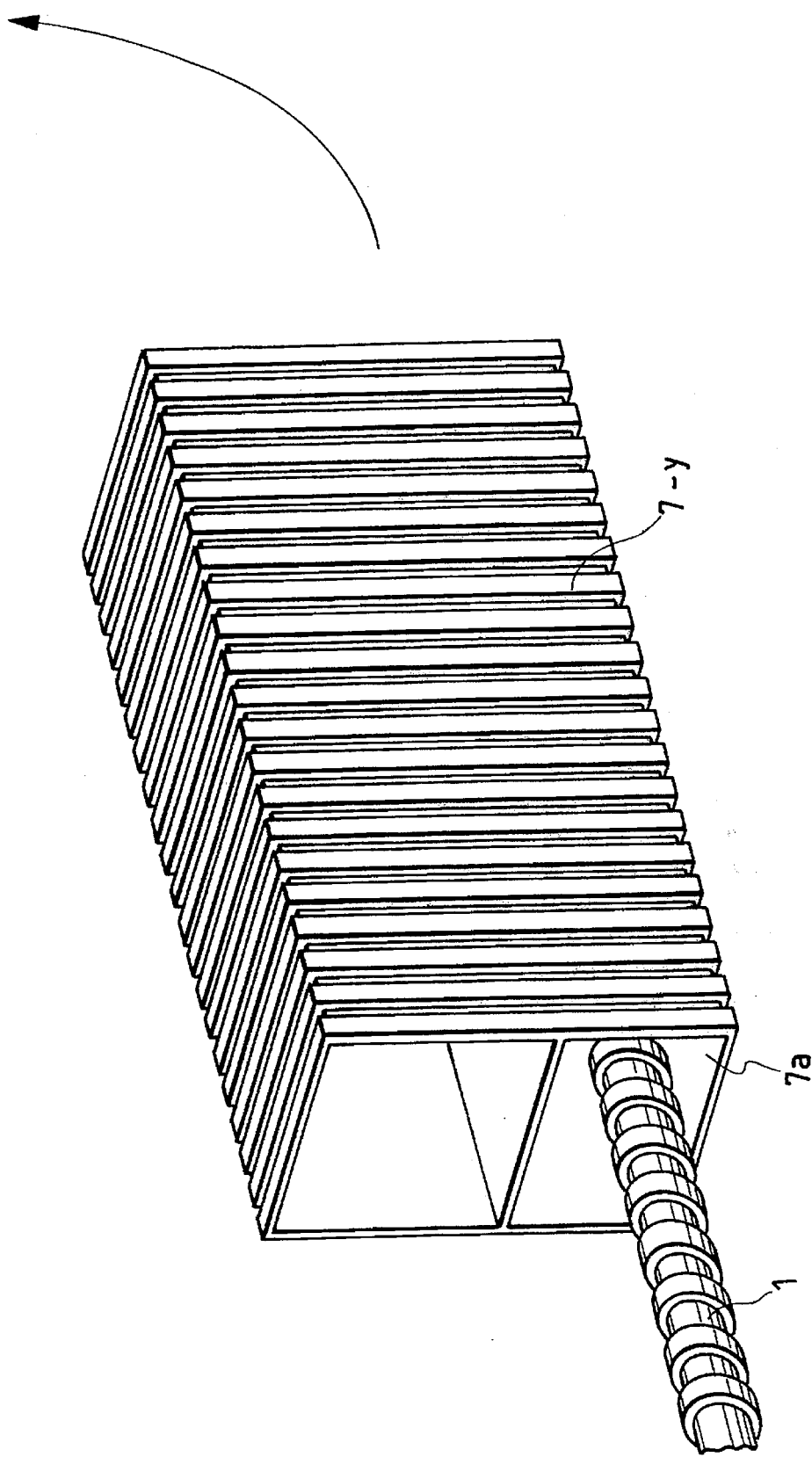
FIG. 3 is a perspective diagram illustrating an end portion of a flexible protective conduit of a laser beam machine according to a third embodiment of the invention.

FIG. 3 is a perspective diagram illustrating an end of a wiring and tubing structure of a laser beam machine according to the third embodiment of the invention, in which a flexible protective conduit 7-y has a dedicated optical fiber cable passage 7a as an integral part thereof. The optical fiber cable 1 coming from the solid laser oscillator (not shown) is introduced into the flexible protective conduit 7-y through an opening of the dedicated optical fiber cable passage 7a. In this embodiment, the positioning mechanism 4 has the same general construction as the first embodiment, except that each flexible protective conduit has a dedicated internal structure for separately passing the optical fiber cable 1. In FIG. 3, there is shown the flexible protective conduit 7-y which can flexibly move on a guide 8-y (not shown) along the Y-axis as previously discussed with reference to the first embodiment. The inside space of the flexible protective conduit 7-y is partitioned by a flexible wall to make two separate passages, for instance, and one of these passages having a larger bending radius when installed is used as the dedicated optical fiber cable passage 7a, through which the optical fiber cable 1 is passed. The other passage contains usually three assist gas tubes 5 (not shown) which provide a choice of assist gas types depending on materials to be cut as well as the X- and Z-axis drive motor power/control cables 6-x and 6-z (not shown). The optical fiber cable 1 is fixed to the guide 8-y (not shown) outside the flexible protective conduit 7-y. Another flexible protective conduit 7-x also has a similar configuration to the flexible protective conduit 7-y.

Discussed in the following is how the third embodiment works when cutting a workpiece W. As the beam output optical assembly 2 moves during a cutting operation, the optical fiber cable 1 is caused to bend together with the flexible protective conduits 7-x and 7-y. The flexible protective conduits 7-x and 7-y do not bend to such an extent that the optical fiber cable 1 passed through the dedicated optical fiber cable passage 7a bends in excess of the permissible bending radius. However, the assist gas tubes 5 and X- and Z-axis drive motor power/control cables 6-x and 6-z (not shown) can be bent to a smaller bending radius than the optical fiber cable 1 since they are accommodated in the upper passage of the flexible protective conduit 7-y, as shown in FIG. 3.

Provision of the dedicated optical fiber cable passage 7a makes it possible to replace the optical fiber cable 1 quickly and easily in case of its accidental breakage without removing and straightening the flexible protective conduits 7-x and 7-y.

Furthermore, since the dedicated optical fiber cable passage 7a is provided on such side of each flexible protective conduit that provides a larger bending radius, the other cables and tubes which do not require a large bending radius can be arranged in the most desirable manner, resulting in a reduction in space requirements for installing the flexible protective conduits.

(FOURTH EMBODIMENT)

Figure 4:
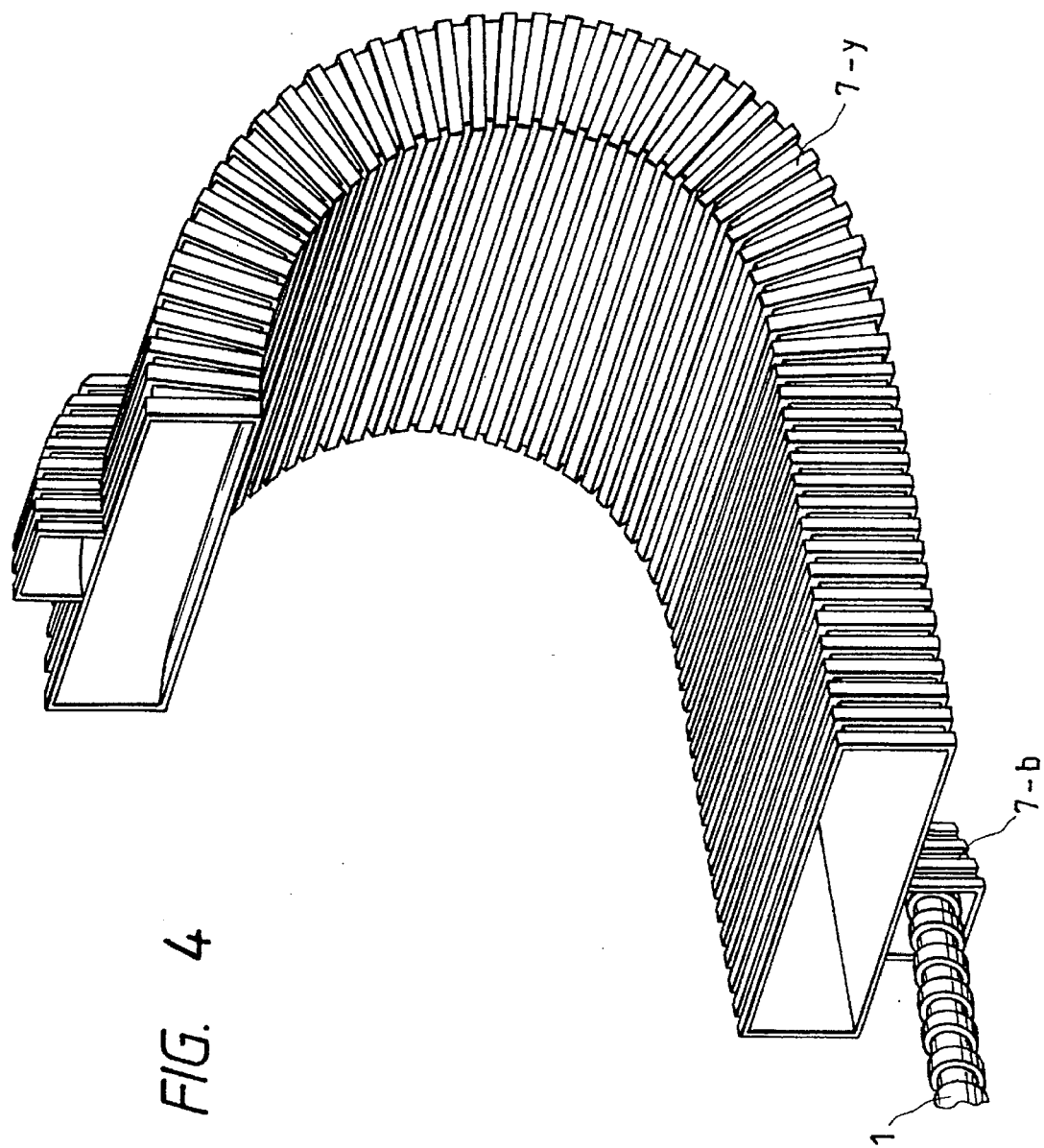
FIG. 4 is a perspective diagram illustrating an end portion of flexible protective conduits of a laser beam machine according to a fourth embodiment of the invention.

FIG. 4 is a perspective diagram illustrating an end of a wiring and tubing structure of a laser beam machine according to the fourth embodiment of the invention, in which a dedicated flexible optical fiber cable protective conduit 7-b is provided outside a flexible protective conduit 7-y. The optical fiber cable 1 coming from the solid laser oscillator (not shown) is introduced into the dedicated flexible optical fiber cable protective conduit 7-b. In this embodiment, the positioning mechanism 4 has the same general construction as the first embodiment, except that the dedicated flexible optical fiber cable protective conduit 7-b is mounted to the outside of each flexible protective conduit. In FIG. 4, there is shown the flexible protective conduit 7-y which can flexibly move on the guide 8-y (not shown) along the Y-axis as previously discussed with reference to the first embodiment. This double conduit configuration is intended to separate the optical fiber cable 1 from the other cables and tubes. More particularly, the optical fiber cable 1 is passed through the dedicated flexible optical fiber cable protective conduit 7-b while the flexible protective conduit 7-y contains usually three assist gas tubes 5 (not shown) which provide a choice of assist gas types depending on materials to be cut as well as the X- and Z-axis drive motor power/control cables 6-x and 6-z (not shown). The dedicated flexible optical fiber cable protective conduit 7-b containing the optical fiber cable 1 is mechanically attached to such side of the flexible protective conduit 7-y that provides a larger bending radius when the flexible protective conduit 7-y is bent. The optical fiber cable 1 is fixed to the guide 8-y outside the flexible protective conduit 7-y (not shown). Another flexible protective conduit 7-x also has a similar configuration to the flexible protective conduit 7-y.

Discussed in the following is how the fourth embodiment works when cutting a workpiece W. As the beam output optical assembly 2 moves during a cutting operation, the optical fiber cable 1 is caused to bend together with the flexible protective conduits 7-x and 7-y. The flexible protective conduits 7-x and 7-y do not bend to such an extent that the optical fiber cable 1 passed through the dedicated flexible optical fiber cable protective conduit 7-b bends in excess of the permissible bending radius. However, the assist gas tubes 5 and X- and Z-axis drive motor power/ control cables 6-x and 6-z (not shown) can be bent to a smaller bending radius than the optical fiber cable 1 since they are accommodated in the flexible protective conduit 7-y.

Since the dedicated flexible optical fiber cable protective conduit 7-b is attached to such side of each flexible protective conduit that provides a larger bending radius, the other cables and tubes which do not require a large bending radius can be arranged in the most desirable manner, resulting in a reduction in space requirements for installing the flexible protective conduits.

(FIFTH EMBODIMENT)

Figure 5:
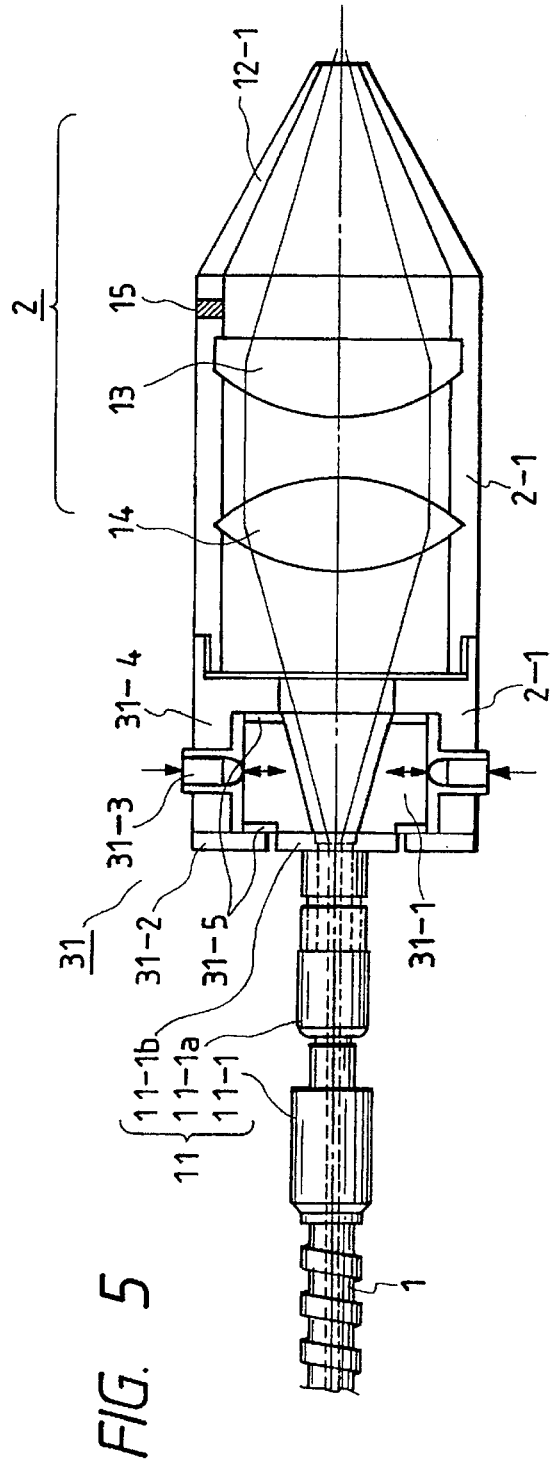
FIG. 5 is a cross-sectional view of a beam output optical assembly used in a laser beam machine according to a fifth embodiment of the invention.

FIG. 5 is a cross-sectional view of a beam output optical assembly 2 used in a laser beam machine according to the fifth embodiment of the invention. In FIG. 5, elements designated by the numerals 1, 2, 2-1, 11, 11-1, 11-1a, 11-1b, 12-1, 13, 14 and 15 are identical or equivalent to those used in the earlier-described conventional laser beam machine. Their detailed description is therefore omitted here.

Referring to FIG. 5, designated by the numeral 31 is a nozzle centering mechanism for centering the nozzle 12-1, designated by the numeral 31-1 is a movable cylinder to which the receptacle 11-1b is fixed, and designated by the numerals 31-2 and 31-4 are first and second holders, respectively, for retaining the movable cylinder 31-1. There are four adjusting screws 31-3 provided at 90° angular intervals around the second holder 31-4 for securing the movable cylinder 31-1 in position. Designated by the numeral 31-5 is a low-friction coat (e.g., Teflon polymer) covering such surface areas of the movable cylinder 31-1 that are kept in contact with the first and second holders 31-2 and 31-4.

Discussed in the following is how the construction of the fifth embodiment works. This embodiment differs from the conventional arrangement in that the nozzle centering mechanism 31 is located between the optical fiber joint 11 and collimator lens 14. Operation of the nozzle centering mechanism 31 is now described in detail. The receptacle 11-1b which is mated with the optical connector 11-1 is fixed to the movable cylinder 31-1 by screws. The movable cylinder 31-1 is secured by the first holder 31-2 and second holder 31-4 which is provided with the adjusting screws 31-3. There is provided a gap between the movable cylinder 31-1 and a cylindrical wall of the second holder 31-4 where the adjusting screws 31-3 are fitted. The second holder 31-4 is screwed onto the beam output optical assembly housing 2-1. The movable cylinder 31-1 can be moved at right angles to the axis of laser light by means of the adjusting screws 31-3 provided on the second holder 31-4. The movable cylinder 31-1 is fixed in position after its exact alignment with the optical axis has been accomplished.

The laser light emitted from the optical fiber cable 1 is converged through the nozzle centering mechanism 31, collimator lens 14, condenser lens 13 and nozzle 12-1 and directed to a workpiece W together with an assist gas. Although the beam output optical assembly 2 is so designed that the laser light emitting end of the optical fiber cable 1 and the center of the nozzle orifice align with the optical axis, small misalignment occurs due to variations in manufacturing processes. Needless to say, the converged laser light should pass the center of the nozzle orifice to obtain a high cutting speed and satisfactory cut surface quality. The fixing position of the optical fiber cable 1 is adjusted by turning the adjusting screws 31-3 provided on the second holder 31-4 to minimize the misalignment due to manufacturing variations.

As seen above, the nozzle centering mechanism 31 is provided between the optical fiber joint 11 and collimator lens 14 in this embodiment. This arrangement makes it possible to reduce the orifice size of the nozzle 12-1, providing not only the capability to process a small area but also an enlarged machining area. In addition, nozzle centering operation is made easier thanks to the low-friction coat 31-5 covering sliding areas of the movable cylinder 31-1.

(SIXTH EMBODIMENT)

Figure 6:
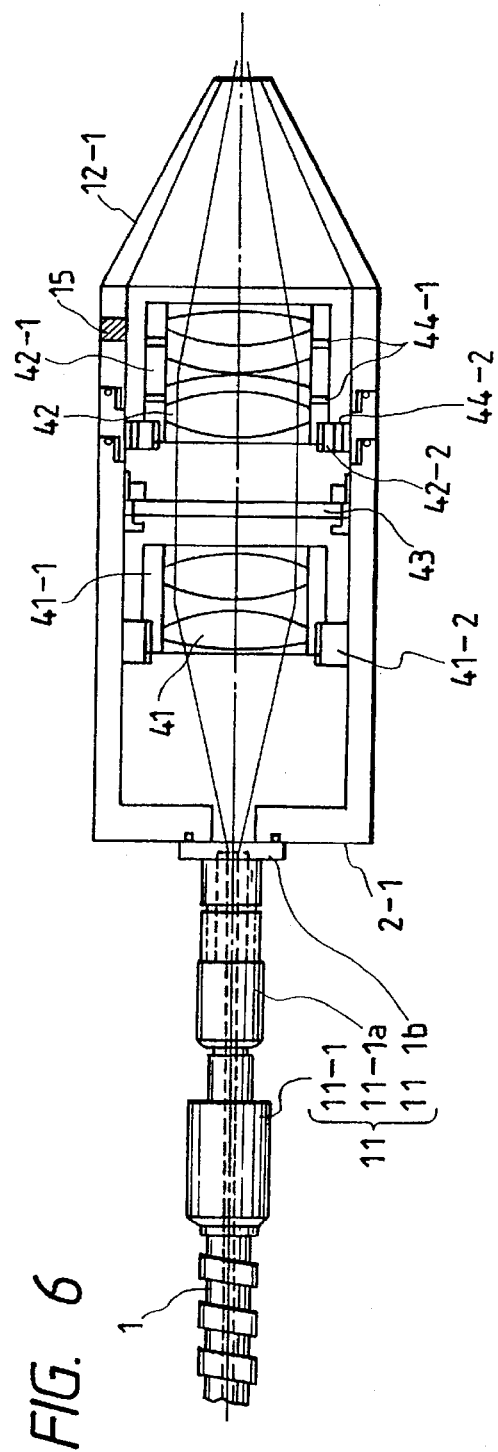
FIG. 6 is a cross-sectional view of a beam output optical assembly used in a laser beam machine according to a sixth embodiment of the invention.

FIG. 6 is a cross-sectional view of a beam output optical assembly 2 used in a laser beam machine according to the sixth embodiment of the invention. In FIG. 6, elements designated by the numerals 1, 2-1, 11, 11-1, 11-1a, 11-1b, 12-1 and 15 are identical or equivalent to those used in the earlier-described conventional laser beam machine. Their detailed description is therefore omitted here.

Referring to FIG. 6, designated by the numeral 41 is a collimator lens comprising a plurality of lenses which are combined by a lens holder 41-1, and designated by the numeral 42 is a condenser lens comprising a plurality of lenses which are combined by a lens holder 42-1. Designated by the numerals 41-2 and 42-2 are lens supports by which the collimator lens 41 and condenser lens 42 are fixed to the beam output optical assembly housing 2-1, respectively. Designated by the numeral 44-1 are a first group of eight through holes provided around the lens holder 42-1 at 45° angular intervals just between constituent lenses of the condenser lens 42, and designated by the numeral 44-2 are a second group of eight through holes provided around the lens support 42-2 at 45° angular intervals. Designated by the numeral 43 is a pressure-proof optical glass plate provided between the collimator lens 41 and condenser lens 42.

Discussed in the following is how the construction of the sixth embodiment works. The laser light emitted from the optical fiber cable 1 is brought into a parallel beam by the collimator lens 41. This parallel beam passes through the pressure-proof optical glass plate 43 and is converged by the condenser lens 42 in such a way that the laser light outgoing through the nozzle 12-1 focuses on the surface of a workpiece W. Both the collimator lens 41 and condenser lens 42 are compound lenses which can better compensate for spherical aberration than single spherical lenses. This serves to reduce the diameter of the focused beam spot on the workpiece W, increase incident energy density and thus improve machining performance. A high-pressure assist gas is injected through the assist gas inlet 15 and blown onto the workpiece W through the nozzle 12-1. Since the assist gas is shut out by the pressure-proof optical glass plate 43, the collimator lens 41 is protected from undesirable effects of the gas pressure. Although the individual lenses of the condenser lens 42 are subjected to the pressure of the assist gas, there occurs no pressure differential between both sides of each individual lens. This is because there are provided the through holes 44-1 1 in the lens holder 42-1 which holds the individual lenses and the through holes in the lens support 42-2 to which the condenser lens 42 is screwed.

As seen above, both the collimator lens 41 and condenser lens 42 are configured as compound lenses. This arrangement helps reduce spherical aberration, focus the laser light more sharply and improve machining performance. In addition, provision of the pressure-proof optical glass plate 43 between the collimator lens 41 and condenser lens 42, associated with the through holes 44-1 and 44-2 provided in the lens holder 42-1 just between individual lenses and in the lens support 42-2, eliminates adverse effects of the assist gas pressure on the individual lenses and prevents their distortion and fracture.

The sixth embodiment may be combined with the arrangement of the fifth embodiment. Such a combination will also provide favorable effects.

(SEVENTH EMBODIMENT)

FIG. 7 is a cross-sectional view of a beam output optical assembly 2 used in a laser beam machine according to the seventh embodiment of the invention, and FIG. 8 is its enlarged fragmentary cross-sectional view. In these drawings, elements designated by the numerals 1, 2-1, 11, 11-1, 11-1a, 11-1b, 12-1 and 15 are identical or equivalent to those used in the earlier-described conventional laser beam machine while elements designated by the numerals 42, 42-1, 42-2, 44-1 and 44-2 are identical to those described with reference to the sixth embodiment. Their detailed description is therefore omitted here.

Referring to FIG. 7, designated by the numeral 51 is a collimator lens comprising a plurality of lenses which are combined by a lens holder 51-1, and designated by the numeral 52-2 is a lens support by which the lens holder 51-1 is fixed to the beam output optical assembly housing 2-1. Designated by the numeral 52-1 are a third group of eight through holes provided around the lens holder 51-1 at 45° angular intervals at locations just between constituent lenses of the collimator lens 51, and designated by the numeral 52-2 are a fourth group of eight through holes provided around the lens support 51-2 at 45° angular intervals.

FIG. 8 is an enlarged view depicting the structure of the optical fiber joint 11 and its surrounding components shown in FIG. 7. In FIG. 8, designated by the numeral 53 is an O-ring fitted to the end surface of the beam output optical assembly housing 2-1 to which the receptacle 11-1b of the optical fiber joint 11 is fixed, and designated by the numeral 54 is a flat ring gasket seated between the receptacle 11-1b and a ferrule 11-3 which constitutes an integral part of the plug 11-1a. The inside diameter of the flat ring gasket 54 is large enough to allow the laser beam to pass through. Designated by the numeral 11-2 is a retaining nut which accompanies the plug 11-1a for tightening the ferrule 11-3 against the flat ring gasket 54. The optical fiber cable 1 is chemically bonded to the ferrule 11-3 (not shown).

Discussed in the following is how the construction of the seventh embodiment works. The laser light emitted from the optical fiber cable 1 is brought into a parallel beam by the collimator lens 51. This parallel beam is converged by the condenser lens 42 in such a way that the laser light outgoing through the nozzle 12-1 focuses on the surface of a workpiece W. Both the collimator lens 51 and condenser lens 42 are compound lenses which can better compensate for spherical aberration than single spherical lenses. This serves to reduce the diameter of the focused beam spot on the workpiece W, increase incident energy density and thus improve machining performance. A high-pressure assist gas is injected through the assist gas inlet 15 and blown onto the workpiece W through the nozzle 12-1. Although the individual lenses of the collimator lens 51 and condenser lens 42 are subjected to the pressure of the assist gas, there occurs no pressure differential between both sides of each individual lens. This is because there are provided the through holes 52-1 and 44-1 in the lens holder 51-1 and lens holder 42-1 which hold the individual lenses and the through holes 52-2 and 44-2 in the lens support 51-2 and lens support 42-2 to which the lens holders 51-1 and 42-1 are screwed, respectively. Furthermore, the optical fiber joint 11 is sealed by means of the O-ring 53, flat ring gasket 54 and a chemical bond so that leakage of the assist gas is prevented.

As seen above, both the collimator lens 51 and condenser lens 42 are configured as compound lenses. This arrangement helps reduce spherical aberration, focus the laser light more sharply and improve machining performance. In addition, the sealed configuration of the optical fiber joint 11, associated with the through holes 44-1, 44-2, 52-1 and 52-2 provided in the lens holders 42-1 and 52-1 just between individual lenses and in the lens supports 42-2 and 52-2, eliminates adverse effects of the assist gas pressure on the individual lenses and prevents their distortion and fracture.

The seventh embodiment may be combined with the arrangement of the fifth embodiment. Such a combination will also provide favorable effects.

What is claimed is:

1. A laser beam machine, comprising:
   an optical fiber cable for transmitting laser light;
   a beam emitting means for emitting the laser light delivered through said optical fiber cable;
   a moving means for moving said beam emitting means;
   a moving cable connected to said moving means;
   an assist gas tube connected to said beam emitting means; and
   a flexible protective conduit for accommodating said optical fiber cable, said moving cable, and said assist gas tube, said flexible protective conduit not being capable of bending to such an extent that said optical fiber cable bends in excess of a permissible bending radius thereof.

2. The laser beam machine of claim 1, wherein said flexible protective conduit is so constructed that said optical fiber cable, said moving cable, and said assist gas tube are accommodated separately from each other.

3. The laser beam machine of claim 2, wherein said flexible protective conduit includes an optical fiber cable guide tube for accommodating said optical fiber cable.

4. The laser beam machine of claim 2, further comprising:
   an internal wall which partitions the inside surface of said flexible protective conduit for separately accommodating said optical fiber cable along such side of said flexible protective conduit that provides a larger bending radius than the other side.

5. The laser beam machine of claim 2, wherein said flexible protective conduit comprises:
   a first flexible protective conduit for accommodating said moving cable and said assist gas tube; and
   a second flexible protective conduit for accommodating said optical fiber cable, said second flexible protective conduit being provided on such side of said first flexible protective conduit that provides a larger bending radius than the other side.

6. A laser beam machine, comprising:
   an optical fiber cable for transmitting laser light;
   a beam emitting means including a housing for holding a collimator lens and a condenser lens; and
   a nozzle centering means provided between said optical fiber cable and said beam emitting means for aligning the optical axis of said optical fiber cable with that of a nozzle of said beam emitting means.

7. The laser beam machine of claim 6, wherein said nozzle centering means comprises:
   a movable member which fixes said optical fiber cable and moves at right angles to the laser light path;
   a holding means for holding said movable member; and
   a fixing means provided on said holding means for moving said movable member at right angles to the laser light path and fixing said holding means.

8. The laser beam machine of claim 7, wherein a surface area of said movable member that is kept in contact with said holding means is coated with a low-friction material.

9. A laser beam machine comprising:

a collimator lens for converting incident laser light into parallel rays of light;

a condenser lens for converging the parallel rays of light, wherein said collimator lens and said condenser lens are compound lenses, each including a plurality of lenses, and the laser light converged by said condenser lens is emitted together with an assist gas;

a beam emitting means including a housing for holding said collimator lens and condenser lens, said housing having a gas inlet for injecting the assist gas, a transmitting medium fixing means for fixing a laser light transmitting medium to said housing;

a condenser lens holder for holding said condenser lens, said condenser lens holder having a first group of through holes in a wall thereof, said through holes being located at a position of said wall located between the lenses constituting said condenser lens:

a condenser lens holder fixing means for fixing said condenser lens holder to said housing and maintaining a gap therebetween, said condenser lens holder fixing means having a second group of through holes extending along the laser light path; and a pressure-proof optical glass plate provided between said collimator lens and said condenser lens for shutting out the assist gas.

10. A laser beam machine, comprising:

a collimator lens for converting incident laser light into parallel rays of light;

a condenser lens for converging the parallel rays of light, wherein said collimator lens and said condenser lens are compound lenses, each including a plurality of lenses, and the laser light converged by said condenser lens is emitted together with an assist gas;

a beam emitting means including a housing for holding said collimator lens and condenser lens, said housing having a gas inlet for injecting the assist gas, a transmitting medium fixing means for fixing a laser light transmitting medium to said housing;

a condenser lens holder for holding said condenser lens, said condenser lens holder having a first group of through holes in a wall thereof, said through holes being located at a position of said wall located between the lenses constituting said condenser lens;

a condenser lens holder fixing means for fixing said condenser lens holder to said housing and maintaining a gap therebetween, said condenser lens holder fixing means having a second group of through holes extending along the laser light path;

a sealing means provided at a mounting portion between said transmitting medium fixing means and said housing for holding said collimator lens and said condenser lens;

a collimator lens holder for holding said collimator lens, said collimator lens holder having a third group of through holes in a wall thereof, said through holes being located at a portion of said wall located between the lenses constituting said collimator lens; and a collimator lens holder fixing means for fixing said collimator lens holder to said housing and maintaining a gap therebetween, said collimator lens holder fixing means having a fourth group of through holes extending along the laser light path.

* * * * *